UNITED STATES PATENT OFFICE.

HENRY YOUNG DARRACOTT SCOTT, OF EALING, ENGLAND.

IMPROVEMENT IN THE PREPARATION OF MORTARS, CEMENTS, &c.

Specification forming part of Letters Patent No. 120,672, dated November 7, 1871.

*To all whom it may concern:*

Be it known that I, HENRY YOUNG DARRACOT SCOTT, of Ealing, in the county of Middlesex, England, have invented certain Improvements in the Preparation of Mortar, Cement, Concrete, Bricks, Blocks, Artificial Stone, and other articles from quicklime, clay, and calcareous shales, for building purposes; and I do hereby declare that the following is a full, clear, and exact description thereof, which will enable others skilled in the art to make and use the same.

My invention relates to an improved method of compounding cementitious materials to be used as mortar or cement, or for plastering walls, uniting bricks and stone, and manufacturing bricks and concrete blocks.

The first part of my invention consists in mixing or dissolving sulphate of lime or other caustic sulphate in the water used for mixing the ingredients composing the mortar or cement. To carry out my plan I mix the water and sulphate and then add quicklime till a pasty mass is formed, when sand may be used to give it a proper mixture and till body is attained. The mortar or cement thus obtained I term "selenitic slip." The following are the proportions of the several ingredients used in preparing the mortar for ordinary building purposes, viz.: Sulphate of lime, one-fifteenth part by measure to one-fiftieth part of quicklime, and four, five, or six parts of coarse sand. Hair, Portland or Roman cement, calcareous shale or marl, puzzolana, sand, shingle, and screened ballast, or water, one or more, are added in proportions to suit the other different purposes for which it, the cement, is designed to be used. The second part of my invention relates to an improved method of producing a hydraulic cement from quicklime, clay, shales, and other substances. This part of the invention, like the former, is based upon the action of sulphates or sulphuric acid on lime. In making hydraulic cement I take of quicklime sixty-seven parts by weight; of fine unctuous clay, thirty parts; and of plaster of Paris, or other cheap and soluble or partially soluble sulphate, such as sulphate of iron, or of sulphuric acid, three parts. Of the lime and sulphate I proceed, as in the former instance, to make a selenitic slip, and after adding the clay and grinding together the ingredients into a homogeneous mass with about sufficient water to bring the resultant compound into the consistency of stiffish mortar, I remove the mixture from the mill. As only sufficient water has been employed to insure the proper admixture of the ingredients, the mass will shortly begin to set and will soon become stiff enough to enable it to be made into bricks or balls; or it may be spread on the floor of a drying chamber and dried. It is believed that the quick-setting property of the mixture is due to the peculiar action of the sulphate upon the quicklime in the compound. By taking advantage of this rapid setting property and by making the mixture of the lime and clay in the manner described, I can produce artificial cements much more speedily and economically than by the present system. The bricks or blocks thus formed are then stacked for drying. They are subsequently burnt in any suitable form of kiln either as bricks are usually burned, or the lump may be burned as lime is burned. The temperature of the kiln must be so regulated as to bring the silex in the clay into the condition in which it can unite freely with the lime, care being taken that the heat is not too great.

I claim—

1. A paste or slip, consisting of a liquid mixture of quicklime and sulphate of lime or other equivalent sulphate, or sulphuric acid, in order that the lime may become thoroughly impregnated with the sulphate and thus lose its normal activity for chemical combination with water.

2. A highly plastic and cementitious selenitic preparation or compound, produced by agitating, triturating, or rubbing together with water, as above described, quicklime with a small percentage of sulphate of lime or other equivalent sulphate, and combining it with other materials, such as sand, chalk, burnt clay, or other substances for the purpose of producing mortar, as herein set forth.

In witness whereof I, the said HENRY YOUNG DARRACOTT SCOTT, have hereunto set my hand and seal the nineteeth day of August, one thousand eight hundred and seventy-one.

HENRY Y. D. SCOTT. [L. S.]

Witnesses:
  H. K. WHITE,
    66 *Chancery Lane.*
  W. B. WYNN,
    24 *Royal Exchange.*